US012370702B2

(12) United States Patent
Hiltz et al.

(10) Patent No.: US 12,370,702 B2
(45) Date of Patent: Jul. 29, 2025

(54) SYSTEMS AND METHODS FOR DESIGNING, TESTING, AND VALIDATING A ROBOTIC SYSTEM

(71) Applicant: MacDonald, Dettwiler and Associates Inc., Brampton (CA)

(72) Inventors: Michael Hiltz, Brampton (CA); Edoardo Serpelloni, Brampton (CA); Robert Lucas, Brampton (CA); Bart Verzijlenberg, Brampton (CA)

(73) Assignee: MacDonald, Dettwiler and Associates Inc., Brampton (CA)

( * ) Notice: Subject to any disclaimer, the term of this patent is extended or adjusted under 35 U.S.C. 154(b) by 295 days.

(21) Appl. No.: 18/248,643

(22) PCT Filed: Oct. 12, 2021

(86) PCT No.: PCT/CA2021/051432
§ 371 (c)(1),
(2) Date: Apr. 11, 2023

(87) PCT Pub. No.: WO2022/073140
PCT Pub. Date: Apr. 14, 2022

(65) Prior Publication Data
US 2024/0017427 A1 Jan. 18, 2024

Related U.S. Application Data

(60) Provisional application No. 63/090,262, filed on Oct. 11, 2020.

(51) Int. Cl.
*B25J 19/00* (2006.01)
*B25J 9/16* (2006.01)

(52) U.S. Cl.
CPC ......... *B25J 19/0095* (2013.01); *B25J 9/1671* (2013.01)

(58) Field of Classification Search
None
See application file for complete search history.

(56) References Cited

U.S. PATENT DOCUMENTS

| 9,440,353 B1 * | 9/2016 | da Silva | B25J 9/1633 |
| 11,494,632 B1 * | 11/2022 | Bai | G06N 3/09 |
| 2022/0261639 A1 * | 8/2022 | Zolna | G06N 3/092 |

FOREIGN PATENT DOCUMENTS

| CN | 104325460 A | 2/2015 |
| CN | 105539890 B | 5/2016 |
| CN | 108621202 A | 10/2018 |

OTHER PUBLICATIONS

A. Ogilvie, J. Allport, M. Hannah, J. Lymer; Autonomous robotic operations for on-orbit satellite servicing; SPIE Defense + Commercial Sensing; 2008.
(Continued)

*Primary Examiner* — Wade Miles
*Assistant Examiner* — Arslan Azhar
(74) *Attorney, Agent, or Firm* — Own Innovation; Kent C. Howe; James W. Hinton

(57) ABSTRACT

Systems and methods for designing, testing, and validating a robotic system for space are provided. A system includes: a robotic manipulator; a dynamic system emulator configured to simulate a motion behaviour response of a first space robotic system based on forces and moments measured by the first robotic manipulator during physical interaction of the first robotic manipulator with a second robotic manipulator emulating motion behaviour of a second space robotic system; an arm controller configured to generate a manipulator tip reference trajectory command based on the motion behaviour response simulated by the dynamic system emulator and provide the manipulator tip reference trajectory command to the robotic manipulator; and an arm mechanism in the robotic manipulator configured to track a trajectory
(Continued)

based on the manipulator tip reference trajectory command, such that the robotic manipulator emulates motion behaviour of the first space robotic system.

15 Claims, 8 Drawing Sheets

(56) References Cited

OTHER PUBLICATIONS

A. Ogilvie, J. Allport, M. Hannah, J. Lymer; Autonomous Satellite Servicing Using the Orbital Express Demonstration Manipulator System; Proceeding of the 9th International Symposium on Artificial Intelligence & Robotics and Automation in Space "SAIRAS", Los Angeles, USA, 2008.
C. Langley, K. Kneisel, R. Rembala, P. Fulford, P. Bellefeuille, B. Bina, Potential Life Cycle Benefits of Intelligent Tools for Ground Control of Space Robotics; Proceedings of the International Astronautical Congress (IAC), 2019.
D. King; Space Servicing: Past, Present and Future; Proceeding of the 6th International Symposium on Artificial Intelligence and Robotics & Automation in Space: i-SAIRAS 2001, Canadian Space Agency; St-Hubert, Quebec, Canada, Jun. 18-22, 2001.
E. Coleshill, L. Oshinowo, R. Rembala, B. Bina, D. Rey, S. Sindelar; Dextre: Improving Maintenance Operations on the International Space Station; Acta Astronautica; vol. 64, Issues 9-10; May-Jun. 2009; pp. 869-874.
J. Schwartz, C. Hall; Historical Review of Air-Bearing Spacecraft Simulators; Journal of Guidance, Control, and Dynamics; vol. 26, No. 4, Jul.-Aug. 2003.
L. Oshinowo, R. Mukherji, C. Lyn, A. Ogilvie, On the Application of Robotics to On-Orbit Spacecraft Servicing—The Next Generation Canadarm Project, Proc. 11th International Symposium on Artificial Intelligence, Robotics and Automation in Space (iSAIRAS), 2012.
M. De Stefano, J. Artigas, W. Rackl, A. Albu-Schaeffer, Passivity of virtual free-floating dynamics rendered on robotic facilities, 2015 IEEE International Conference on Robotics and Automation (ICRA), 781-788.
M. Hiltz, C. Rice, K. Boyle, R. Allison; Canadarm: 20 Years of Mission Success Through Adaptation; Proceedings of the 6th International Symposium on Artificial Intelligence and Robotics and Automation in Space; i-SAIRAS 2001, Canadian Space Agency, St-Hubert, Quebec, Canada, Jun. 18-22, 2001.
P. K. Nguyen, M. Hiltzx, RMS Operations Support: From the Space Shuttle to the Space Station; Proceedings of the 6th International Symposium on Artificial Intelligence and Robotics and Automation in Space: i-SAIRAS 2001, Canadian Space Agency, St-Hubert, Quebec, Canada, Jun. 18-22, 2001.
R. McGregor, L. Oshinowo, Flight 6A: Deployment and Checkout of the Space Station Remote Manipulator System (SSRMS); Proceedings of the 6th International Symposium on Artificial Intelligence and Robotics and Automation in Space: i-SAIRAS 2001, Canadian Space Agency, St-Hubert, Quebec, Canada, Jun. 18-22, 2001.
S. S. Sachdev, Canadarm—a review of its flights, Journal of Vacuum Science & Technology, 268-272 (1986).
Extended European Search Report issued in respect of European Patent Application No. 21876829.9 on Sep. 3, 2024.
Lu Qi et al: "Passive Gravity Compensation Mechanisms: Technologies and Applications", Recent Patents in Engineering, vol. 5, No. 1, Apr. 1, 2011 (Apr. 1, 2011), pp. 32-44, XP093197958, NL ISSN: 1872-2121, DOI: 10.2174/1872212111105010032.
Tian Xia et al: "Augmented reality environment with virtual fixtures for robotic telemanipulation in space", Intelligent Robots and Systems (IROS), 2012 IEEE/RSJ International Conference ON, IEEE, Oct. 7, 2012 (Oct. 7, 2012), pp. 5059-5064, XP032280736, DOI: 10.1109/IROS.2012.6386169, ISBN 978-1-4673-1737-5.
Yang Haitao et al: "Ground micro-gravity emulation system for space robot capturing the target satellite", 2015 IEEE International Conference on Robotics and Biomimetics (Robio), IEEE, Dec. 6, 2015 (Dec. 6, 2015), pp. 2585-2590, XP032873440, DOI: 10.1109/ROBIO.2015.7419729 [retrieved on Feb. 24, 2016].
CIPO as International Searching Authority, International Search Report and Written Opinion for PCT/CA2021/051432, Jan. 28, 2022.

* cited by examiner

SYSTEMS AND METHODS FOR DESIGNING, TESTING, AND VALIDATING A ROBOTIC SYSTEM

TECHNICAL FIELD

The following relates generally to robotics, and more particularly to systems and methods for designing, testing, and validating a robotic system for space, including emulating robotic interactions with free-flying spacecraft.

INTRODUCTION

With advances in automation and artificial intelligence, robotic systems promise to be indispensable in future space initiatives, such as Lunar Gateway and on-orbit satellite servicing. While there are a number of challenges in designing, testing, and validating a robotic system for space, one of the most difficult is optimizing the control system for zero-gravity (0G) performance and evaluating the interaction of such systems with free-flying payloads or a variety of worksite interfaces.

Accordingly, improved systems and methods for designing, testing, and validating robotic systems for space are desired that overcome at least some of the disadvantages of existing systems and methods.

SUMMARY

Provided are systems and methods for any one or more of designing, testing, and validating a robotic system.

A system for ground testing and operations planning of robotic systems for space is provided. The system includes: a first robotic testing system comprising: a first robotic manipulator; a first dynamic system emulator configured to simulate a motion behaviour response of a zero-gravity (0G) servicer robotic arm based on forces and moments measured by the first robotic manipulator during physical interaction of the first robotic manipulator with a second robotic manipulator emulating motion behaviour of a client space robotic system; a first arm controller configured to generate a first manipulator tip reference trajectory command based on the motion behaviour response simulated by the first dynamic system emulator and provide the first manipulator tip reference trajectory command to the first robotic manipulator; and a first arm mechanism in the first robotic manipulator configured to track a first trajectory based on the first manipulator tip reference trajectory command, such that the first robotic manipulator emulates motion behaviour of the 0G servicer robotic arm. The system also includes a second robotic testing system comprising: the second robotic manipulator; a second dynamic system emulator configured to simulate a motion behaviour response of the client space robotic system based on forces and moments measured by the second robotic manipulator during physical interaction of the second robotic manipulator with the first robotic manipulator emulating motion behaviour of the 0G servicer robotic arm; a second arm controller configured to generate a second manipulator tip reference trajectory command based on the motion behaviour response simulated by the second dynamic system emulator and provide the second manipulator tip reference trajectory command to the second robotic manipulator; and a second arm mechanism in the second robotic manipulator configured to track a second trajectory based on the second manipulator tip reference trajectory command, such that the second robotic manipulator emulates motion behaviour of the client space robotic system.

The system may further include a mixed reality (MR) system communicatively connected to the first and second robotic testing systems and configured to overlay a first virtual model of the 0G servicer robotic arm onto the first robotic manipulator and a second virtual model of the client space robotic system onto the second robotic manipulator.

The client space robotic system being emulated by the second robotic testing system may be a free floating spacecraft.

A robotic testing system for ground testing performance of a space robotic system is provided. The robotic testing system includes: a robotic manipulator; a dynamic system emulator configured to simulate a motion behaviour response of a first space robotic system based on forces and moments measured by the first robotic manipulator during physical interaction of the first robotic manipulator with a second robotic manipulator emulating motion behaviour of a second space robotic system; an arm controller configured to generate a manipulator tip reference trajectory command based on the motion behaviour response simulated by the dynamic system emulator and provide the manipulator tip reference trajectory command to the robotic manipulator; and an arm mechanism in the robotic manipulator configured to track a trajectory based on the manipulator tip reference trajectory command, such that the robotic manipulator emulates motion behaviour of the first space robotic system.

The first space robotic system may be a 0G servicer robotic arm.

The first space robotic system may be a client space robotic system to be serviced by a servicer robotic arm.

The client space robotic system may be a free floating satellite.

A method of ground testing and validating robotic interaction between two independent space robotic systems is provided. The method includes: emulating motion behaviour of a zero-gravity (0G) servicer robotic arm with a first robotic arm using a first dynamic system emulator in the first robotic arm configured to capture manipulator tip dynamics of the 0G servicer robotic arm; emulating motion behaviour of a free floating satellite with a second robotic arm using a second dynamic system emulator in the second robotic arm configured to capture dynamics of the free floating satellite; physically interacting the first robotic arm with the second robotic arm while emulating the motion behaviours; measuring forces and moments experienced by the first robotic arm based on the physical interaction via a force moment sensor (FMS) in the first robotic arm; measuring forces and moments experienced by the second robotic arm based on the physical interaction via an FMS in the second robotic arm; simulating a response to the measured forces and moments by the first robotic arm using the first dynamic system emulator; simulating a response to the measured forces and moments by the second robotic arm using the second dynamic system emulator; tracking a trajectory with the first robotic arm based on the simulated response outputted by the first dynamic system emulator; and tracking a trajectory with the second robotic arm based on the simulated response outputted by the second dynamic system emulator.

The method may further include providing initial conditions to each of the first and second dynamic system emulators to determine initial states for the 0G servicer robotic arm and free floating satellite being emulated.

The initial conditions provided to second dynamic system emulator may include an initial drift of the emulated free floating satellite.

The method may further include overlaying a virtual model of the 0G servicer robotic arm being emulated onto the first robotic arm and overlaying a virtual model of the free floating satellite being emulated onto the second robotic arm.

The method may further include gravity offloading the first robotic arm to 0G via a passive offloading mechanism.

The method may further include gravity offloading the first robotic arm to 0G via an active offloading mechanism comprising a third robotic manipulator.

The method may further include adjusting a mass, inertia, stiffness, or damping property of the emulated free floating satellite by the dynamic system emulator to emulate a mass, inertia, stiffness, or damping changing event (or, generically, a "dynamics changing event") on the emulated spacecraft.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
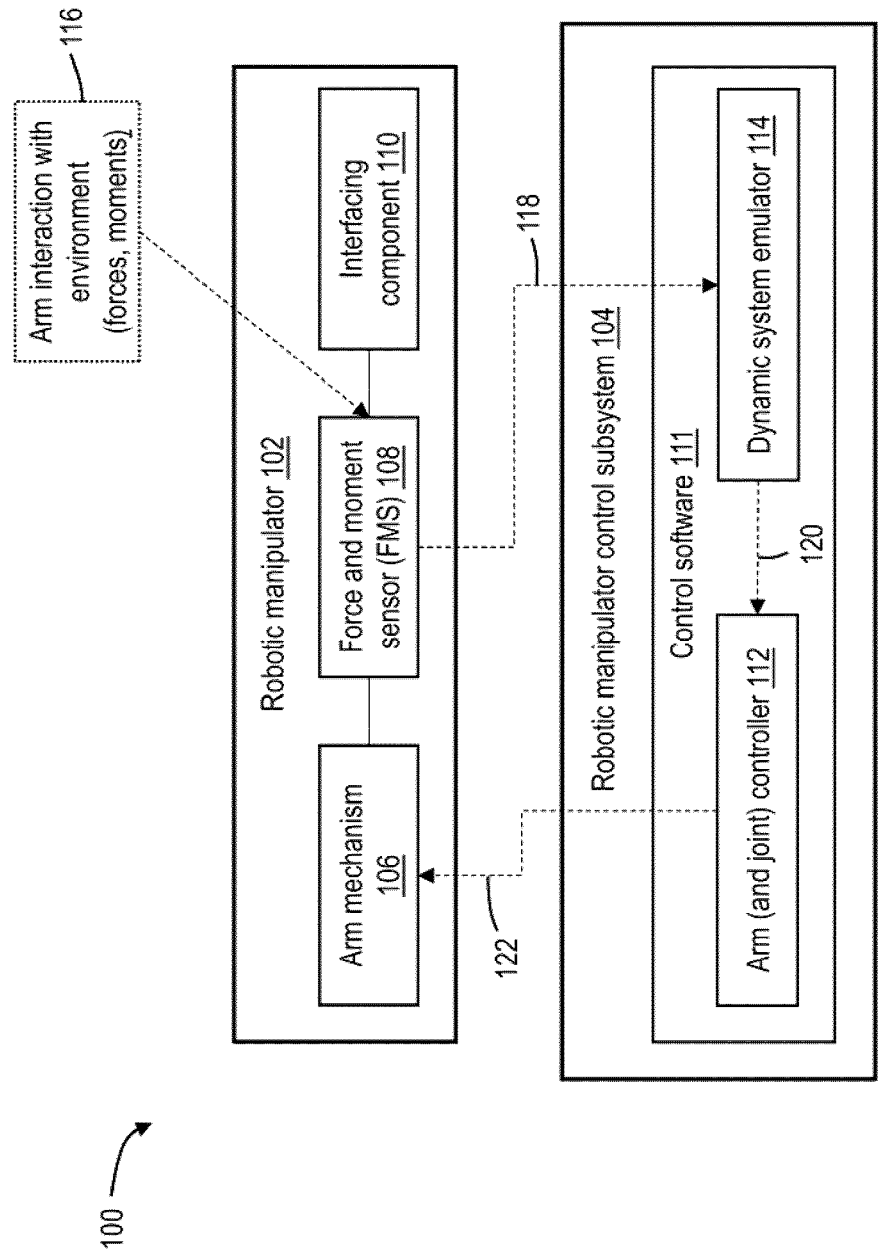
FIG. 1 is a block diagram of a robotic testing system for emulating a space-based robotic system to enable any one or more of design, testing, and validation of the space-based robotic system on ground, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to robotics, and more particularly to systems and methods for any one or more of designing, testing, and validating a robotic system for use and operation in space, including emulating robotic interactions with free-flying spacecraft.

Referring now to FIG. 1, shown therein is a robotic testing system 100, according to an embodiment.

The robotic testing system 100 can be used to emulate a servicer robotic system or a client robotic system as part of a larger system for designing, testing, or validating a robotic system which includes two independent robotic systems having independent control systems for the performance of collaborative tasks. The robotic system 100 may thus be used, for example, as part of a ground testing process for evaluating the performance and interaction of robotic systems to be used in space.

For example, the robotic testing system 100 may be used to emulate a servicer robotic system, such as a servicer 0G robotic manipulator, as part of a ground testing process.

The robotic system 100 includes a robotic manipulator (also referred to as robotic arm in the case of serial robot manipulators) 102 and a robotic manipulator control subsystem 104.

Generally, in operation, the robotic manipulator 102 and robotic manipulator control subsystem 104 communicate with one another.

The robotic manipulator 102 includes an arm mechanism 106, a force and moment sensor (FMS, or force torque sensor) 108, and an interfacing component 110.

The arm mechanism 106 includes an assembly of links and joints. The links are rigid sections of the arm mechanism 106 and joints are the connections between two links which allow restricted relative motion between the two connected links. The number of links and joints may vary depending on the application.

The arm mechanism 106 is configured to track a trajectory based on commands received from an arm controller (arm controller 112, described below). The arm mechanism 106 may also provide joint angle measurements to robotic manipulator control subsystem 104 (i.e. to the arm controller) for processing.

The FMS 108 is configured to measure contact forces and moments experienced by the robotic manipulator 102. The FMS 108 provides the force and moment sensor measurements to the robotic manipulator control subsystem 104.

The interfacing component 110 is a component typically at or near a tip or free end of the robotic manipulator 102 that participates in a physical interfacing or mating interaction with a complementary interfacing component on a second robotic manipulator of a second independent robotic system. As such, the interfacing component 110 is used to physically mate the robotic manipulator 102 to the second robotic manipulator in a manner similar to that that would be performed in actual operation (i.e. between the two emulated robotic systems outside of the testing context).

In an example, the interfacing component 110 is one half of a robotic interface that participates in a capture and rigidization operation whereby the first robotic manipulator 102 is rigidized with respect to a second robotic manipulator emulating a second dynamic system (robotic manipulator 102 may be captured, or may be performing the capturing). The capture and rigidization operation may be intended to mimic capture and rigidzation of a free floating or free flying spacecraft (e.g. satellite) by a space robotic manipulator.

The robotic manipulator control subsystem 104 includes control software 111 including an arm controller 112 and a dynamic system emulator 114.

The arm controller 112 provides arm and joint level commands (e.g. commands 122, described below) to the arm mechanism 106. The arm and joint level commands may be provided based on any one or more of inputs from external sensors, outputs from other controllers, and automated commands. The arm controller 112 may be configured to perform force control by which the arm controller 112 regulates contact forces between the robotic manipulator 102 and the second robotic system/manipulator with which the robotic manipulator 102 is interacting. The arm controller 112 may be configured to perform visual servo control by which the arm controller 112 maintains a certain standoff distance and matches drift rate with a target satellite being emulated by a second robotic testing system with which the robotic testing system 100 is interacting.

The dynamic system emulator 114 comprises a simulator that can be configured to capture the dynamics of a desired electro-mechanical system. The dynamic system emulator 114 may be incorporated in software that controls a reference trajectory of the arm mechanism 106. The dynamic system emulator 114 enables the tip (or some point of resolution near the free end) of the robotic arm 102 to replicate behaviour of a desired dynamical system. This may include, for example, emulating tip dynamics of a target manipulator that is different from the robotic manipulator 102 (e.g. shorter/longer, lighter/heavier) or emulating floating dynamics a free floating spacecraft.

In an embodiment, emulated system (e.g. space manipulator, satellite) dynamics/kinematics may be coded in the dynamic system emulator 114 through Simulink or similar programming environment.

In an embodiment, the dynamic system emulator 114 may be configured to emulate a 0G robotic arm that is configured to perform one or more service tasks ("servicer robotic arm"). In another embodiment, the dynamic system emulator 114 may be configured to emulate a client space robotic system, such as a robotic worksite interface or a free floating satellite. Generally, the client space robotic system is a robotic system that is serviced by a servicer robotic arm via robotic system interaction.

The dynamic system emulator 114 is configured to execute a dynamical system model. The dynamical system model may represent a mathematical model of the target behaviour of the tip of the robotic manipulator 102.

In some cases, the dynamic system emulator 114 may be configured such that initial conditions can be provided to the dynamic system emulator 114. Initial conditions may be provided, for example, via user input data inputted via a user interface. The initial conditions can then be used by the dynamic system emulator 114 to determine an initial state of the dynamical system being simulated. In an example, initial conditions may be provided to the dynamic system emulator 114 assigning an initial desired drift rate to the robotic manipulator 102 when the dynamic system emulator 114 is configured to emulate dynamics of a free floating satellite.

Generally, when the system 100 is in operation, as the robotic manipulator 102 interacts with the environment, the robotic manipulator 102 experiences forces (contact forces) and moments 116 which are measured by the FMS 108. The FMS measurements 118 are provided to the dynamic system emulator 114. The FMS measurements 118 are used to drive internal simulation by the dynamic system emulator 114. The FMS measurements 118 may be provided to the dynamical system model simulation as external disturbances. The dynamic system emulator 114 uses the dynamical system model to simulate the system's response to the forces and moments. The output of the internal simulation performed by the dynamic system emulator 114 is then tracked by the arm mechanism 106 of the robotic manipulator 102. The system response determined by the dynamic system emulator 114 may be used to generate a reference trajectory for the arm mechanism 106 to track. For example, the dynamic system emulator 114 may produce the system response as a manipulator 102 tip reference command, which command 120 can be communicated to the arm controller 112. The reference command signal is then tracked via arm and joint control action, through arm and joint commands 122 (based on the output of the dynamic system emulator 114) communicated from the arm controller 112 to the arm mechanism 106.

Figure 2:
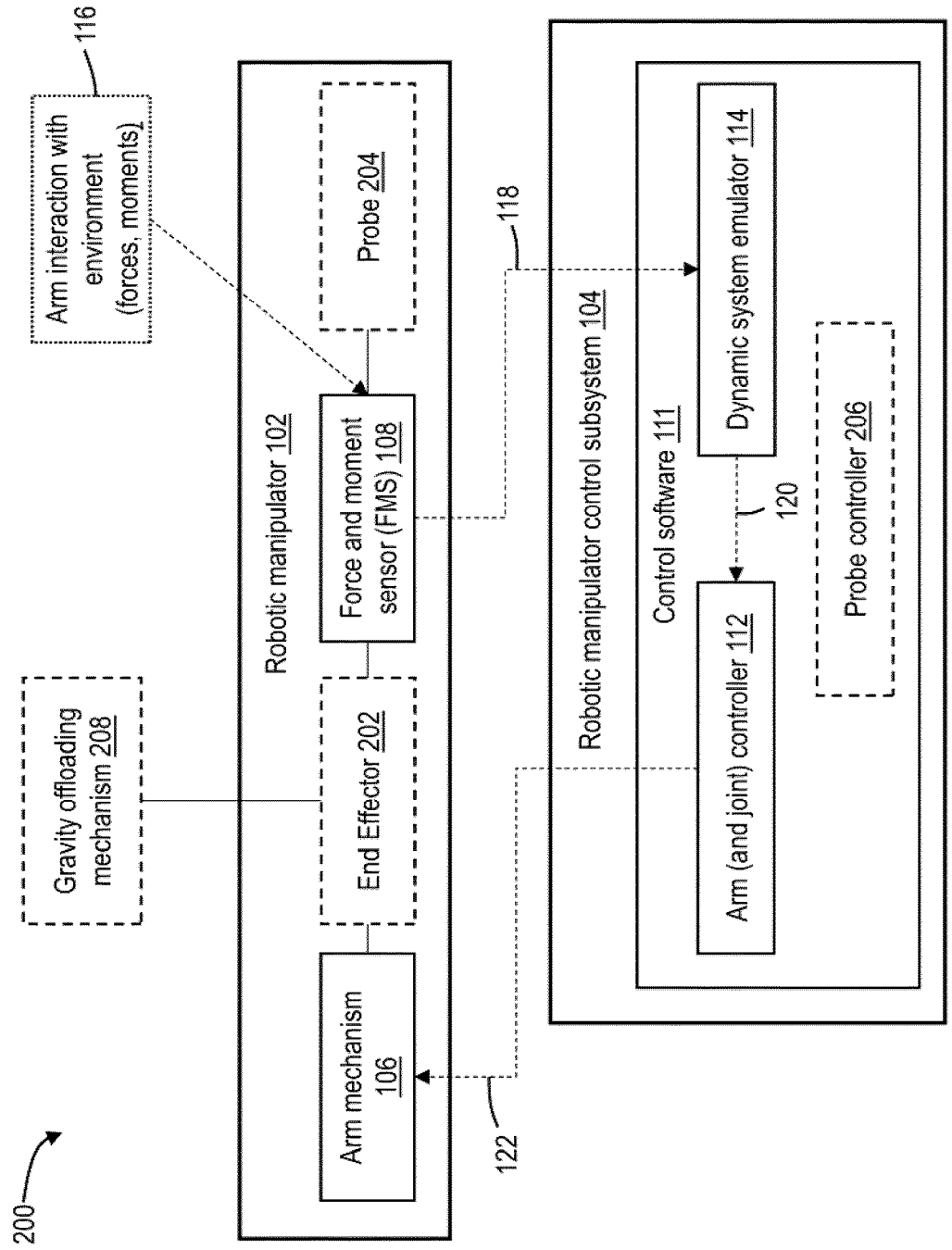
FIG. 2 is a block diagram of the robotic testing system of FIG. 1 configured to emulate a typical space robotic manipulator, according to an embodiment.

Referring now to FIG. 2, shown therein is a robotic testing system 200 for use in a system for ground testing and validation of space-based robotic systems interaction, according to an embodiment.

Robotic testing system 200 is an example of the robotic testing system 100 of FIG. 1 in which the dynamical electro-mechanical system being emulated is a servicer space robotic arm. Accordingly, any of the examples below may be applied to system 100 and any examples described above in reference to system 100 may be applied to system 200.

Figure 3:
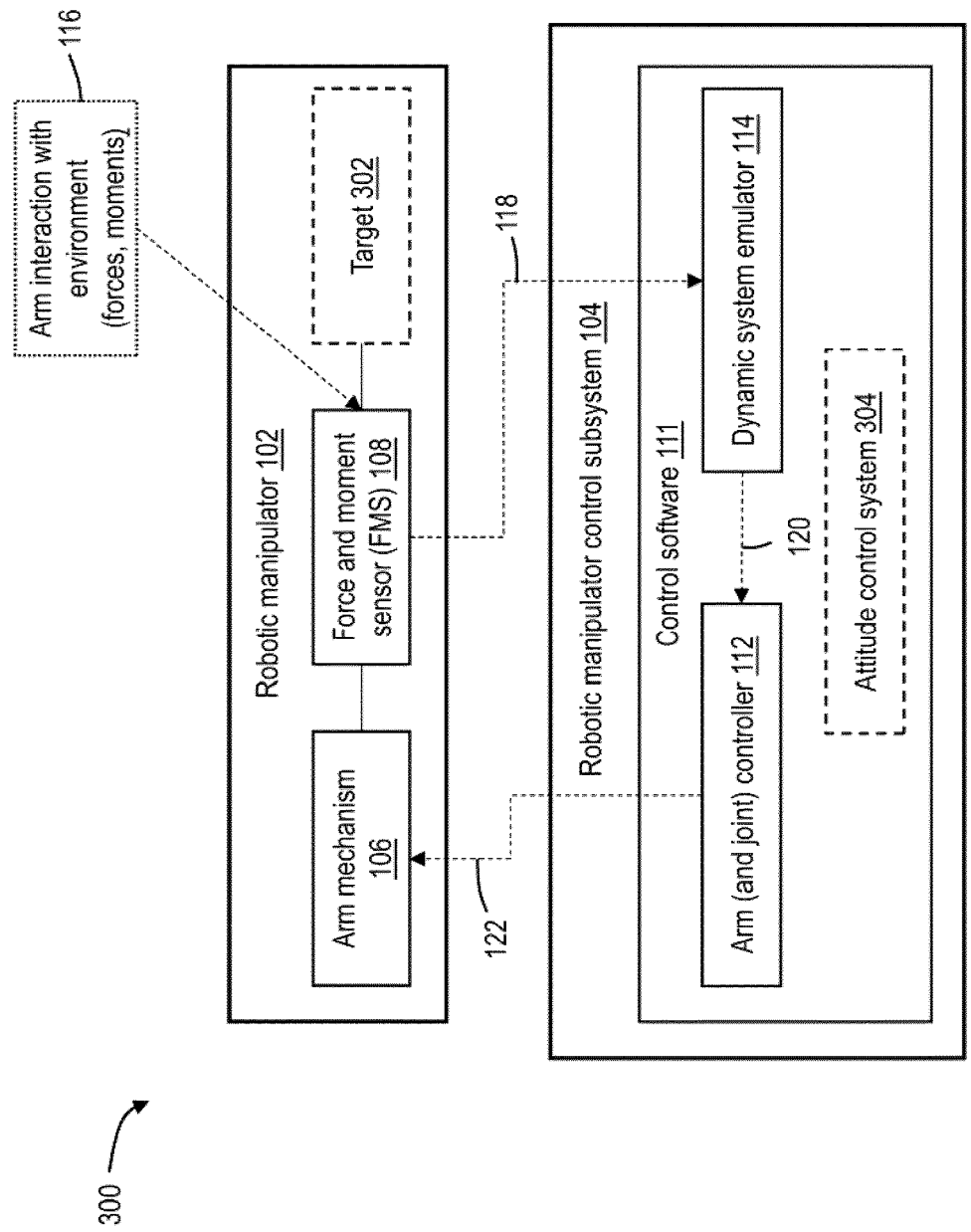
FIG. 3 is a block diagram of the robotic testing system of FIG. 1 configured to emulate a free floating spacecraft, according to an embodiment.

The robotic system 200 can be used to replicate the dynamic performance of different manipulator designs and concepts (i.e. one or more "target manipulators") as well as interact with a dynamic emulator system which has the versatility to mimic a wide variety of free-flying payloads and worksite interfaces (e.g. system 300 of FIG. 3).

In particular, robotic testing system 200 is configured to emulate the tip dynamics of a different manipulator. The different manipulator may be, for example, a larger or smaller robotic arm, or a lighter or heavier robotic arm. The different manipulator may be a 0G arm.

The robotic manipulator 102 includes an end effector 202 connected to the arm mechanism 106. The end effector 202 is a peripheral device or tool connected to the free end of the arm mechanism 106 and is configured to interact with the environment (e.g. with another robotic system, such as the robotic testing system of FIG. 3, described below).

The robotic manipulator 102 also includes probe 204, which is the interfacing component 110 of the system 200. The probe 204 is configured to engage an interfacing component 110 on a second robotic testing system (e.g. system 300 of FIG. 3) and establish a physical connection between the robotic testing system 200 and the second robotic testing system. The probe 204 may also be configured to perform visual tracking of a target on the second robotic testing system. Operation of the probe 204 is controlled by a probe controller 206 in the robotic manipulator control subsystem 104.

The robotic testing system 200 also includes a gravity offloading mechanism 208. The gravity offloading is configured to gravity offload the robotic manipulator 102 such that the robotic manipulator 102 acts as a 0G robotic manipulator.

The gravity offloading mechanism 208 may be a passive gravity offloading mechanism or an active gravity offloading mechanism.

The dynamic system emulator 114 of the robotic testing system 200 is configured to capture and emulate tip dynamics of a "target manipulator" (e.g. 0G manipulator). The dynamic system emulator 114 is configured to capture the target manipulator dynamics and control scheme.

The robotic manipulator 102 may be a seven degrees-of-freedom (DOF) manipulator. The robotic manipulator 102 may be configured to be kinematically equivalent to a robotic arm of a known space manipulator system.

The robotic manipulator 102 may be configured to use a roll-yaw-pitch-pitch-pitch-yaw-roll topology.

The gravity offloading mechanism 208 may be used to counterbalance the entire weight of the arm 102. Passive counterbalancing of the arm 102 may be provided by redistributing the arm weight so that each link's center of mass falls on its joint drive axis and balancing the end effector 202 weight with a cable pulley system.

The gravity offloading mechanism 208 may guarantee that over a limited workspace the arm 102 operates in a near-weightless environment. This behaviour may be enforced by preventing the pitch plane from rotating by locking the first of the arm's 102 yaw joints, making the arm effectively a 6 DOF arm.

The arm joints of the arm mechanism 106 may be configured to be flight representative in terms of gear ratio, gearbox stiffness, and output torque.

The robotic manipulator 102 may be equipped with one or more end effectors 202.

The robotic testing system 200 may provide superior payload handling abilities are superior over other ground robots given the arm's 102 own weight being balanced by gravity offloading mechanism 208.

For example, the robotic testing system 200, using the configured dynamic system emulator 114 can be used to emulate a 0G manipulator that is configured to perform any one or more of the following tasks: capture incoming visiting vehicles and payloads, dock them (e.g. to ISS), perform (complex) station maintenance and repair tasks, assembly and maintenance tasks; capture visiting vehicles (unmanned or manned) and dock them to a station; reconfigure position of modules on the station; move on the outer structure of the station to reach desired locations; perform maintenance and repair tasks; and satellite servicing tasks (i.e. space missions whose goal is to rendezvous with existing spacecraft in need of assistance and provide it with life extending services like: refueling, maintenance, repair). Accordingly, performance of such tasks can be ground tested using the robotic testing system 200 (as well as other systems described herein).

Referring now to FIG. 3, shown therein is a robotic testing system 300, according to an embodiment.

Robotic testing system 300 is an example of the robotic testing system 100 of FIG. 1 in which the dynamical electro-mechanical system being emulated is a free floating spacecraft (e.g. a satellite). Accordingly, any of the examples below may be applied to system 100 and any examples described above in reference to system 100 may be applied to system 300.

The dynamic system emulator 114 of system 300 is configured to emulate the dynamics of a free floating satellite. Satellites emulated by the dynamic system emulator 114 may include controlled and uncontrolled satellites of various inertias and geometries.

The robotic manipulator 102 may be configured to operate as a conventional 1G capable arm.

The robotic manipulator 102 includes target 302, which is the interfacing component 110 of the system 300. The target 302 is configured to interface with an interfacing component 110 on a second robotic testing system (e.g. probe 204 of system 200 of FIG. 2) and establish a physical connection between the robotic testing system 300 and the second robotic testing system. The target 302 may be a passive side or half of a robotic interface, the active half of which is provided by the second robotic testing system interacting with the system 300. The target 302 may include a visual target component for enabling visual tracking by a second robotic testing system.

The robotic manipulator control subsystem 104 further includes an attitude control system 304. The attitude control system 304 is configured to operate as the attitude control system of the satellite being emulated by the robotic testing system 300. In this mode, the robotic manipulator control subsystem 104 can emulate the internal control system of the client spacecraft, effectively allowing the testing of interactions between the servicer robot and an actively controlled and operating client spacecraft.

In an embodiment, the robotic manipulator 102 can use the dynamic system emulator 114 to enable hardware-in-the-loop testing of satellite attitude control hardware (actuators and sensors) and software (flight code). In this scenario, the robotic manipulator 102 emulates the passive dynamics of the target satellite dynamics as described herein. Instead of including virtualized actuators and sensors models, actual actuators (e.g., cold gas thrusters, control moment gyros, or reaction wheels) and sensors (e.g., accelerometers or attitude sensors) may be mounted to the tip of the arm 102 via a mechanical interface. The control forces and torques are read by the arm force-torque sensor 108 and used to update the arm response to emulate the target satellite. This setup allows for testing of the actual software and hardware of a satellite's attitude and position control subsystem.

Figure 4:
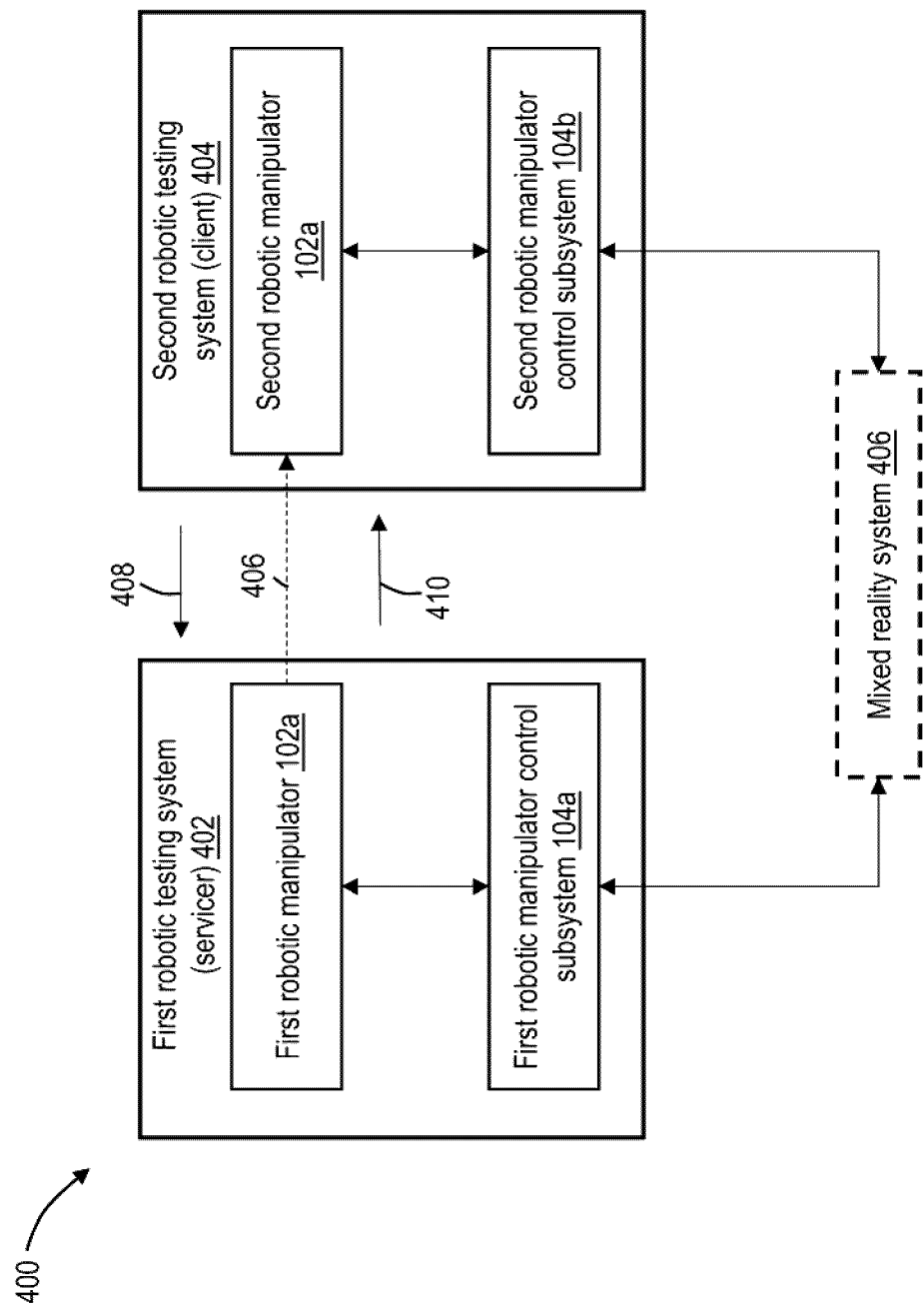
FIG. 4 is a block diagram of a system for designing, testing, or validating robotic systems and mission operations on ground for use in space, the system including first and second instances of the robotic system of FIG. 1 each configured to emulate a different dynamical system, according to an embodiment.

Referring now to FIG. 4, shown therein is a system 400 for ground testing and validating space-based robotic system interaction between a servicer robotic system (e.g. servicer robotic arm) and a client robotic system (e.g. free floating satellite, robotic worksite interface), according to an embodiment.

In an example, the system 400 may be used to evaluate and investigate performance of a space robotic arm when interacting with dynamical systems whose behavior cannot be easily replicated in conventional ways.

The system 400 includes a first robotic testing system 402 and a second robotic testing system 404. The system 400 also optionally includes a mixed reality system 406.

The first and second robotic testing systems 402, 404 are instances of the robotic test system 100 of FIG. 1 that have been differently configured. Accordingly, any of the examples below may be applied to system 100 and any examples described above in reference to system 100 may be applied to system 400. Components of the first and second robotic testing systems 402 have been given the same reference numerals as FIG. 1 with the addition of 'a' and 'b', respectively, for clarity.

In particular, first robotic test system 402 is an example of the robotic test system 200 of FIG. 2 and second robotic test system 404 is an example of the robotic test system 300 of FIG. 3.

The first robotic test system 402 is configured to emulate a 0G servicer robotic arm and the second robotic test system 404 is configured to emulate a client robotic system in the form of a free floating spacecraft (satellite).

In other embodiments, the second robotic test system 404 may be configured to emulate a different client space robotic system, such as a robotic worksite interface.

In an embodiment, the first robotic manipulator 102a may be a seven DOF, gravity compensated (0G) robotic arm and the second robotic manipulator 102b may be a seven DOF 1G robotic arm for dynamic systems evaluation.

Generally, the first and second robotic testing systems 402, 404 are configured to emulate the servicer robotic arm and free floating spacecraft, respectively, and physically interact, such that the interaction between the two space-based robotic systems being emulated can be evaluated in a ground-based testing environment.

In particular, the dynamic system emulator 114 executed by the first robotic manipulator control subsystem 104a of the first robotic testing system 402 is configured such that the tip of the first robotic manipulator 102a emulates motion behavior of a 0G servicer robotic arm. The dynamic system emulator 114 executed by the second robotic manipulator control subsystem 104b of the second robotic testing system 404 is configured such that the tip of the second robotic manipulator 102b emulates motion behavior of a free floating satellite.

The first and second robotic testing systems 402, 404 may run the same arm and joint control systems 112.

The first and second robotic testing systems 402, 404 are operated such that the first robotic manipulator 102a visually tracks and establishes a physical connection with the second robotic manipulator 102b (designated by arrow 406). The physical connection may be a free flyer capture emulation. As the first and second systems 402, 404 interact, contact forces and moments 408, 410 are experienced by the first and second robotic manipulators 102a, 102b, respectively. The forces and moments are measured by the systems 402, 404 as previously described and used to drive the internal simulation executed by the dynamic system emulator 114.

The MR system 406 communicates with the control subsystems 104a, 104b of the first and second robotic testing systems 402, 404. Data communicated from the control subsystems 104a, 104b to the MR system 406 may include positioning data (position and orientation). The positioning data may include, for example, positioning data of a point of resolution on the end effector of the respective robots 102a, 102b. In general, generalized trajectory information may be shared between the control subsystems 104a, 104b and the MR system 406. Generalized trajectory information may include, for example, generalized position (x, y, z, yaw, pitch, roll) and its derivatives: generalized velocity, acceleration. This is used by the MR software of the MR system 406 to project visual emulations of the objects of interest, e.g., the actual servicer arm geometries and the actual client spacecraft geometries, or abstracted data (such as described below).

Data communicated from the MR system 406 to the control subsystems 104a, 104b includes command and control data. This enables an operator to send scripted commands to the robots 402, 406 (such as described below).

The MR system 406 may be configured to enable operators to remote control the first and second robotic arms 102a, 102b.

The MR system 406 may be configured to overlay virtual models of the two robotic systems being emulated onto the robotic manipulators 102a, 102b. The MR system 406 may be configured to attach virtual models on the arms 102a, 102b. Overlaying the satellite virtual model on top of what the robot 404 is emulating allows to easily understand the maneuver/test that is being executed. Overlaying the virtual model of the robotic manipulator being emulated by system 402 can provide quick visualization of the arm response, etc.

The MR system 406 may be configured to render telemetry. Rendered telemetry may include actual telemetry of the robotic arm 102a, 102b. Rendered telemetry may include virtual telemetry generated by the dynamic system emulator 114 (not shown in FIG. 4) in the respective system 402, 404.

The MR system 406 may be configured to define models and constraints on models, create/enforce common reference frames, and route telemetry for render.

The MR system 406 may be configured to script an entire test of the robotic systems 402, 404. For example, the MR system 406 may be configured such that the operator can load and execute arm scripted behaviour.

The MR system 406 may be configured such that a user can design, plan, and execute maneuvers with the first and second robotic arm systems 402, 404 to support mission planning tasks. The MR system 406 may provide visualization of the arms' 102a, 102b telemetry streams in real time from any position in the testing environment.

The MR system 406 may be configured to enable reconfiguration of the arms 102a, 102b and select commands to issue, such as through a user interface executed by the MR system 406.

The system 400 may provide various functionalities and capabilities, and have various testing applications, including designing and testing navigation and control algorithms, performing control parameters tuning for actual arm operations, rapid prototyping novel control algorithms for future robotic missions and for updates to existing systems, perform performance evaluation of newly tuned first robotic arm control system parameters (controller tuning), mission planning, testing out operational sequences, evaluating robotic arm performance in free-space maneuvers and when the arm is in contact with structure, and testing robotic interfaces and satellite captures.

Figure 5:
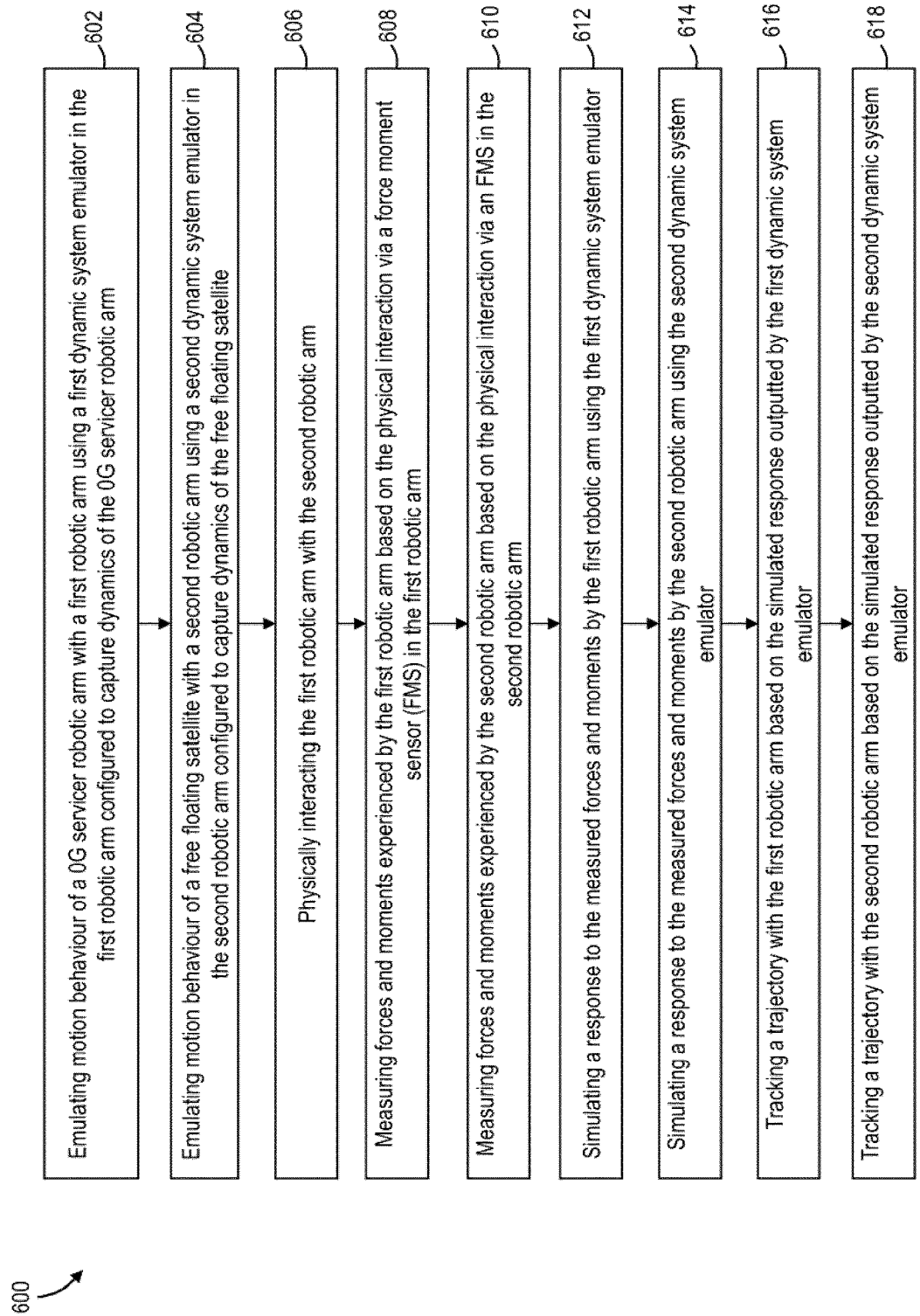
FIG. 5 is a flow diagram of a method of ground testing and validating a space robotics system including first and second interacting dynamical systems, according to an embodiment.

Referring now to FIG. 5, shown therein is a method 600 of ground testing and validating robotic interaction between two independent space robotic systems, according to an embodiment.

The method 600 may be implemented using the system 400 of FIG. 4.

At 602, the method 600 includes emulating motion behaviour of a 0G servicer robotic arm with a first robotic arm (e.g. robotic testing system 402). The emulating is performed using a first dynamic system emulator (e.g. dynamic system emulator 114 of FIG. 1) configured to capture the dynamics of the 0G servicer robotic arm. For example, the dynamic system emulator may be configured to capture tip dynamics of the target manipulator (0G servicer robotic arm) and control scheme in the dynamic system emulator 114.

At 604, the method 600 includes emulating motion behaviour of a free floating satellite with a second robotic arm (e.g. robotic testing system 404). The emulating is performed used a second dynamic system emulator (e.g. dynamic system emulator 114 of FIG. 1) configured to capture the dynamics, such as the floating dynamics, of the free flying satellite.

Emulating dynamics of the free floating satellite may include virtually incorporating attitude determination and control of the satellite in the dynamic system emulator or emulating attitude determination and control of the satellite using actual attitude determination and control hardware in the second robotic arm (e.g. gyros, thrusters, etc.).

Optionally, prior to 602 and 604, the method 600 may include providing initial conditions (e.g. dynamic system conditions) to each of the first and second dynamic system emulators to determine initial states for the 0G servicer robotic arm and free floating satellite. Initial conditions may be provided by an operator via a user interface. In an example, providing initial conditions may include assigning an initial drift to the second robotic arm when emulating the dynamics of the free floating satellite.

At 606, the method 600 includes physically interacting the first robotic arm (emulating the 0G servicer robotic arm) with the second robotic arm (emulating the free floating satellite). The physical interacting may include, for example, replicating a physical interaction between the two emulated robotic systems in space, such as performance of a task or operation by the servicer robotic arm in respect of the free floating satellite. In an example, the physical interaction may include a capture and rigidization process through which the first robotic arm captures and rigidizes the second robotic arm mimicking a free floating capture operation in space.

At 608, the method 600 includes measuring forces and moments experienced by the first robotic arm based on the physical interaction at 606. The forces and moments are measured by an FMS (e.g. FMS 108 of FIG. 1) in the first robotic arm.

At 610, the method 600 includes measuring forces and moments experienced by the second robotic arm based on the physical interaction at 606. The forces and moments are measured by an FMS (e.g. FMS 108 of FIG. 1) in the second robotic arm.

At 612, the method 600 includes simulating a response to the measured forces and moments by the first robotic arm using the first dynamic system emulator in the first robotic arm. In doing so, the first dynamic system emulator simulates a response of the 0G servicer robotic arm.

At 614, the method 600 includes simulating a response to the measured forces and moments by the second robotic arm using the second dynamic system emulator in the second robotic arm. In doing so, the second dynamic system emulator simulates a response of the free floating satellite.

At 616, the method 600 includes tracking a trajectory with the first robotic arm based on the simulated response outputted by the first dynamic system emulator at 612. In doing so, the first robotic arm emulates the motion behaviour of the 0G servicer robotic arm based on physical interaction with the free floating satellite emulated by the second robotic arm. This may include providing the output of the first dynamic system emulator to an arm controller of the first robotic arm to generate arm and joint commands, which can then be communicated from the arm controller to the arm mechanism of the first robotic arm.

At 618, the method 600 includes tracking a trajectory with the second robotic arm based on the simulated response outputted by the second dynamic system emulator at 614. In doing so, the second robotic arm emulates the motion behaviour of the free floating satellite based on physical interaction with the 0G servicer robotic arm emulated by the first robotic arm. This may include providing the output of the second dynamic system emulator to an arm controller of the second robotic arm to generate arm and joint commands, which can then be communicated from the arm controller to the arm mechanism of the second robotic arm.

Optionally, during the performance of the method 600, the method 600 may further include overlaying a virtual model of the 0G servicer robotic arm being emulated onto the first robotic arm and overlaying a virtual model of the free floating satellite being emulated onto the second robotic arm. The overlaying of virtual models may be performed by a mixed reality system, such as MR system 406 of FIG. 4. Overlaying may include, for example, registering or superimposing the virtual models onto the real physical system hardware (i.e. the first and second robotic arms). Any suitable registration technique may be used. The overlaying may be performed during any portion of method 600.

The method 600 may also include gravity offloading the first robotic arm to 0G via a passive offloading mechanism or active offloading mechanism (e.g. offloading mechanism 208 of FIG. 2). The passive offloading mechanism may include, for example, a pulley system with offset weights and pendulum cable offloaders, wherein the end of the first robotic arm is suspended using cables in pendulum format carried by a gantry system. The passive offloading mechanism may include, for example, a passive pulley-driven offloading system at the tip of the first robotic arm and counterbalance features in the manipulator joints (e.g. wrist and elbow). The active offloading mechanism may include a robotic manipulator (e.g. terrestrial robotic arm) configured to provide gravity offloading to the first robotic arm.

The method 600 may also include adjusting a mass, inertia, stiffness, or damping property of the emulated spacecraft by the dynamic system emulator. For example, the dynamic model of the dynamic system emulator can be changed at the controller update rate. This means that on-orbit separations, deployments (e.g. of a solar array, a radio aperture, or an antenna, which may correspond to a stiffness or damping property adjustment), and changes in mass due to propulsion usage can be emulated (in real-time) by the dynamic system emulator.

Figure 6:
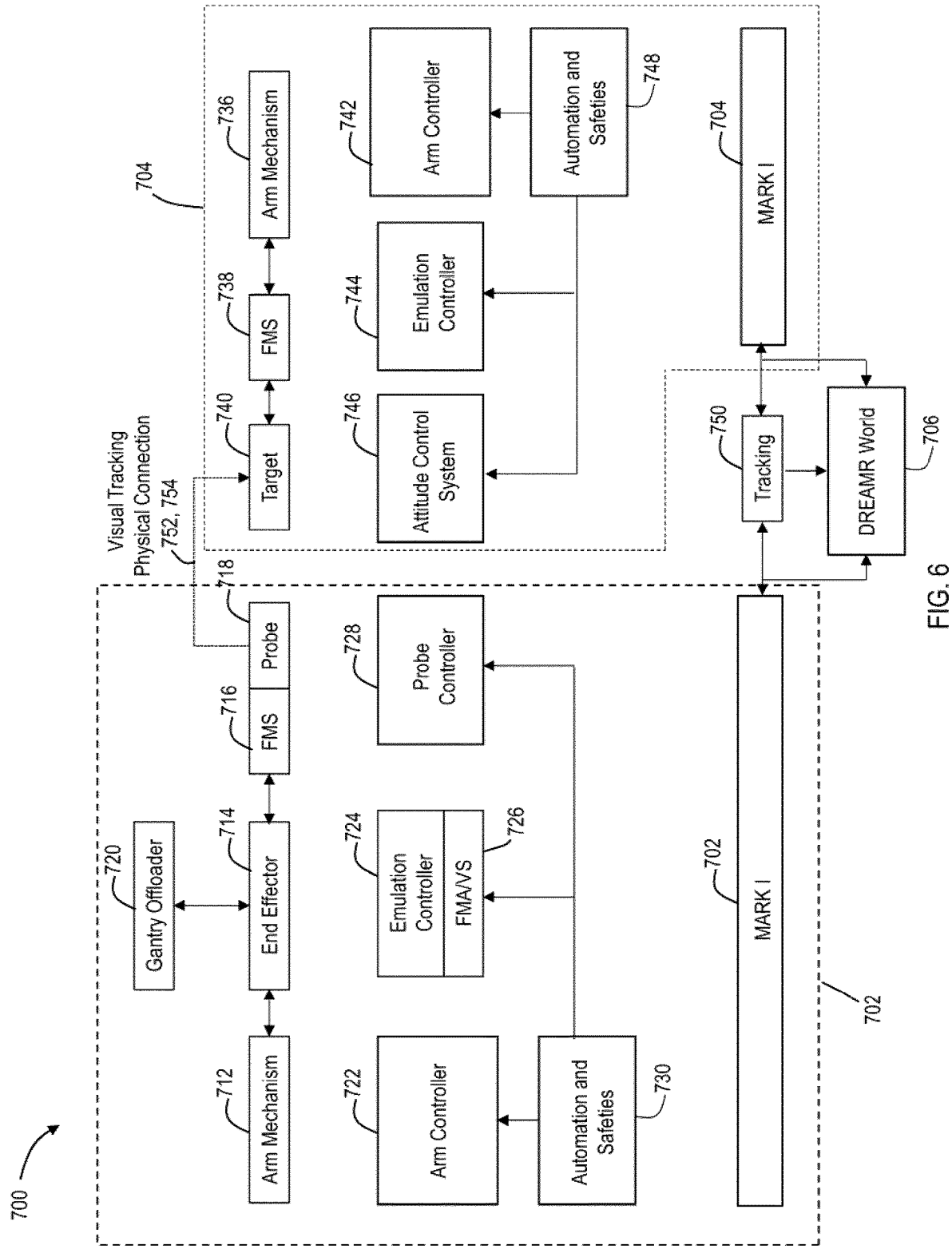
FIG. 6 is a block diagram of a system for designing, testing, and validating a robotic system for use in space, according to an embodiment.
Figure 7:
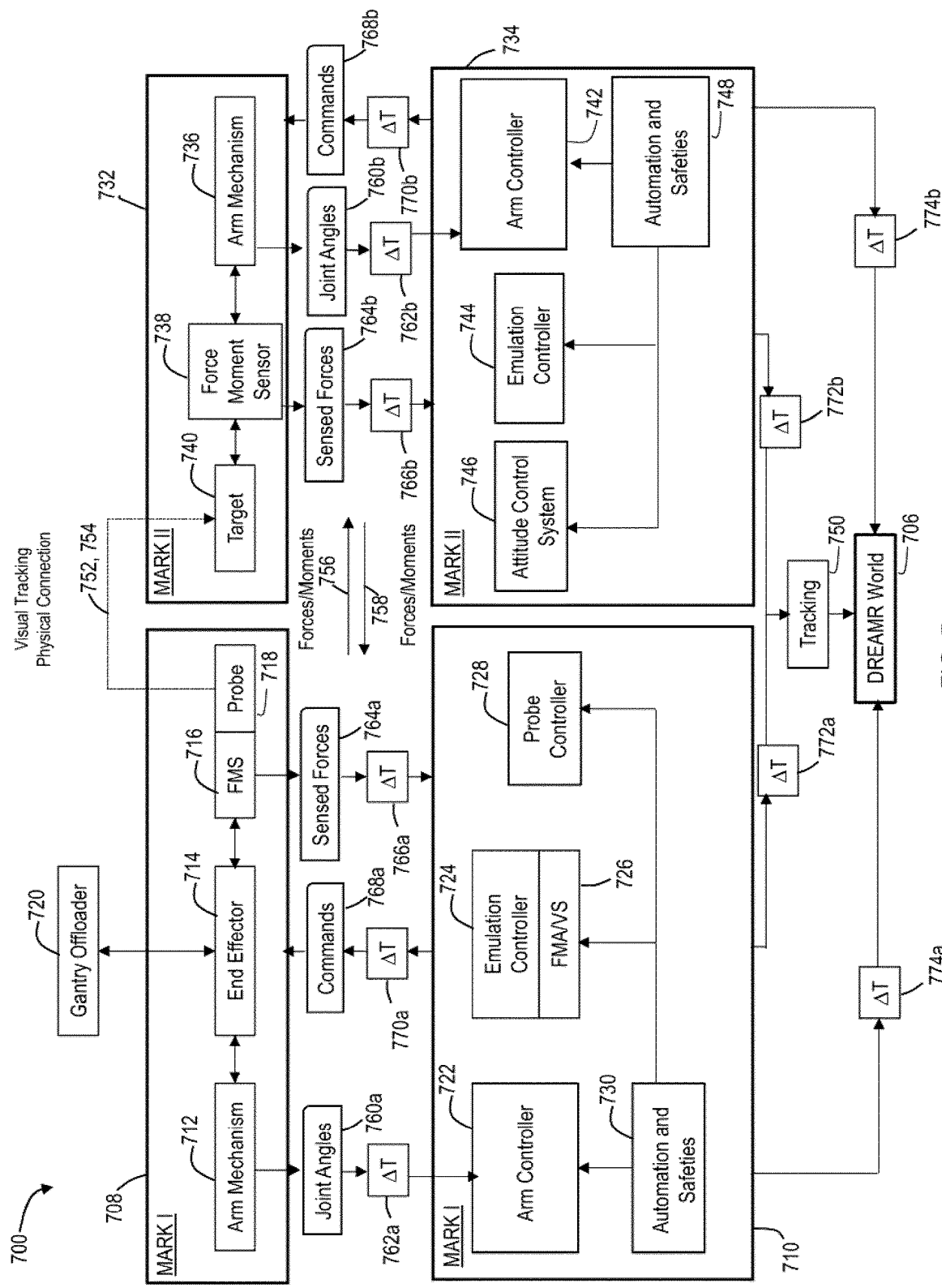
FIG. 7 is a block diagram of the system of FIG. 6 further illustrating Mission Analysis Robotic Kit I ("MARK I") and Mission Analysis Robotic Kit II ("MARK II") interactions and system time delays, according to an embodiment.
Figure 8:
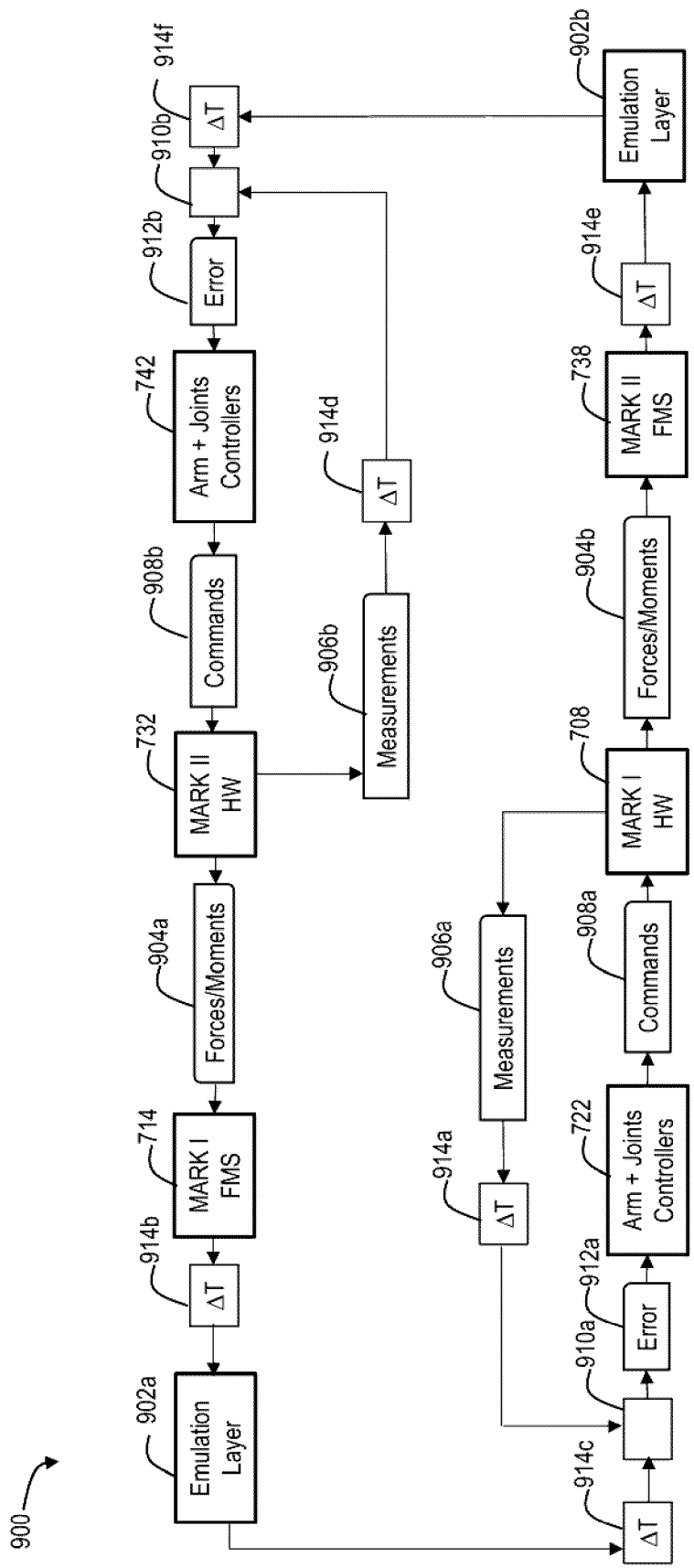
FIG. 8 is a block diagram illustrating an emulation layer in the MARK I and MARK II systems of the system of FIGS. 6 and 7, according to an embodiment.

Reference will now be made to FIGS. 6 to 8, which illustrate a particular embodiment of the systems and methods for testing and validating a robotic system for space of the present disclosure. The system embodiment may be referred to as DREAMR Lab. The embodiment includes a first robotic testing system, referred to as Mission Analysis Robotic Kit I ("MARK I"), and a second robotic testing system, referred to as Mission Analysis Robotic Kit II ("MARK II"). MARK I and MARK II are embodiments of the robotic testing system 100 of FIG. 1. In particular, MARK I may be an embodiment of the robotic testing system 200 of FIG. 2, and MARK II may be an embodiment of the robotic testing system 300 of FIG. 3. The MARK I and MARK II may be used together as part of a system for testing and validating robotic systems for space, which may correspond to the system 400 of FIG. 4.

The MARK I and MARK II systems comprise a collection of independent control systems, which together enable collaborative tasks of the two independent robotic systems.

Referring now to FIGS. 6 and 7, shown therein is a system 700 for testing and validating a robotic system for space, according to an embodiment. FIG. 6 shows the system 700 as a high level block diagram of components. FIG. 7 shows the system 700 as in FIG. 6 with further details on interactions between the MARK I and MARK II and system time delays. Relevant system time delays may include round trip delay of sensed signal to processing to command.

The system 700 includes MARK I 702 and MARK II 704. The system 700 also includes a mixed reality system 706 (or augmented reality or virtual reality system, referred to herein as DREAMR World), which is communicatively connected to the MARK I 702 and the MARK II 704.

The MARK I 702 includes a robotic manipulator 708 and a robotic manipulator control subsystem 710 for controlling operation of the robotic manipulator 708.

The robotic manipulator 708 includes an arm mechanism 712 and an end effector 714 at the end of the arm mechanism 712. The robotic 708 manipulator also includes a force moment sensor 716 and a probe 718 (for establishing physical connection, e.g. mating, with the MARK II).

The MARK I 702 also includes a gantry offloader 720. The gantry offloader is connected to the end effector 714 and configured to passively gravity offload the robotic manipulator 708 such that the robotic manipulator acts as a 0G robotic arm.

The robotic manipulator control subsystem 710 includes an arm controller 722 for controlling operation of the arm mechanism 712, an emulation controller 724, a force moment accommodation (FMA) and visual servoing (VS) unit 726, and a probe controller 728 for controlling operation of the probe 718. Force Moment Accommodation (FMA) includes software configured to interpret and utilize the FMS data by the manipulator. Similarly, visual servoing uses data from a vision system to provide corrections to robot motion. For example, the arm can use the vision system data to change its trajectory to track a target. The robotic manipulator control subsystem 710 also includes an automation and safeties controller 730. The automation and safeties controller 730 may be configured to sense a fault condition (e.g. experienced load, unexpected current) and trigger a safety reaction (e.g. braking event, stopping abruptly). To trigger the safety reaction, the automation and safeties controller 730 may communication with any one or more of the controllers 722, 724, 728.

The MARK II 704 includes a robotic manipulator 732 and a robotic manipulator control subsystem 734 for controlling operation of the robotic manipulator 732.

The robotic manipulator 732 includes an arm mechanism 736, a force moment sensor 738, and a target 718 for visual tracking and physical contact with the probe 718.

The robotic manipulator control subsystem 734 includes an arm controller 742 for controlling operation of the arm mechanism 736, an emulation controller 744, and a attitude control system 746. The robotic manipulator control subsystem 734 also includes an automation and safeties controller 748. The automation and safeties controller 748 may be configured to sense a fault condition (e.g. experienced load, unexpected current) and trigger a safety reaction (e.g. braking event, stopping abruptly). To trigger the safety reaction, the automation and safeties controller 748 may communication with any one or more of the controllers 742, 744, 746.

The robotic manipulators 708, 732 of the MARK I 702 and MARK II 704 each perform tracking 750 based on outputs of their respective emulation controllers 724, 744. The tracking 750 is used as input to the mixed reality system 706.

The arm mechanisms 712, 736 of the MARK I robotic manipulator 708 and MARK II robotic manipulator 732 generate and send joint angle data 760a, 760b to the respective arm controller 722, 742. The communication of joint angle data 760a, 760b includes associated time delays 762a, 762b.

The FMS 716, 738 of the MARK I robotic manipulator 708 and MARK II robotic manipulator 732 generate sensor measurements and communicate sensor measurements 764a, 764b to the respective controller subsystem 710, 734. The communication of sensed forces data 764a, 764b includes associated time delays 766a, 766b. The FMS measurements 764a, 764b are provided as input to the emulation controller 724, 744.

The robotic manipulator control subsystem 710, 734 generates commands 768a, 768b and communicates the commands 768a, 768b to the respective robotic manipulators 708, 732. The commands 768a, 768b includes arm and joint level commands (e.g. manipulator tip reference command) which are tracked via arm and joint action of the arm mechanism 712, 736. The communication of commands 768a, 768b includes associated time delays 770a, 770b.

The system 700 also includes time delays 772a, 772b, 774a, 774b associated with communication of sensor and command signals between the controller subsystems 710, 734 of the MARK I 702 and MARK II 704 and the MR system 706. Time delays 772a, 772b refer to the signal delay from the respective robotic platforms 710, 734 via the tracking system 750 to the DREAMR system 706. So, an external system is measuring fiducials on each robot 702, 704 and relaying the position and orientation from these. The measurement, processing, and transmission/reception of these signals results in a time delay. Similarly, the robotic systems 710, 734 send data about their sensor and joint states directly to DREAMR system 706. These signals are also delayed (by a lesser amount typically). This time delay is shown at 774a, 774b.

The computing and software running the MARK I and MARK II systems 702, 704 (e.g., emulation controller 724, 744, emulation layer 902a, 902b) may be optimized to minimize the time delays 762-774 in FIG. 7. The time delay minimization may seek to minimize software and databus overheads using, for example, direct connections with few resources using a given databus, real-time polling or interrupts, and/or higher data rate implementations. Minimizing time delays 762-774 may reduce likelihood of controller performance degradation.

The system 700 is configured to emulate a free flyer capture operation and evaluate control systems interactions of the robotic systems (MARK I and MARK II) participating in the free flyer capture operation.

To perform the task, an emulation package (e.g. a software package executed by the emulation controller 744, such as emulation layer 902 of FIG. 9) of the MARK II 704 is configured to cause the MARK II 704 to emulate the dynamics of an actual satellite (i.e. a free floating spacecraft). The task then involves the MARK I 702 reaching a standoff distance from its target 740 and commanding a capture mechanism of the MARK I 702 (e.g. probe 718) to secure the target 730 of the MARK II 704. Performing this free flyer capture task in a laboratory setting is especially challenging: in addition to the obvious challenges involved in completing such a free flyer capture task, doing so in a laboratory requires cooperation between the MARK I 702 and MARK II 704 once the target 740 of the MARK II 704 (e.g. a liquid apogee motor "LAM" nozzle) is captured and rigidized by the MARK I 702 capture mechanism. Once the two robotic systems 702, 704 are rigidized together, the robotic systems 702, 704 cooperate to avoid the induction of unstable behavior. Two control system scenarios are often considered for these types of operations. In a first scenario (Scenario 1, passive capture), only the servicer control systems (spacecraft and robotic servicer arm control systems), which are emulated by the emulation controller 724 of the MARK I 702, are active while client attitude and orbital control systems, which are emulated by the emulation controller 744 of the MARK II, are deactivated so that during and after the act of capture, the servicer (mimicked in system 700 by MARK I 702) and client orbital control systems do not compete against each other. In a second scenario (Scenario 2, active capture), the control systems of the servicer (mimicked in system 700 by MARK I 702) and the client (mimicked in system 700 by MARK II 704) are both active. This second scenario is often considered when trying to perform captures of a free flying spacecraft without perturbing the pointing of the client satellite.

In both first and second scenarios described above, in the system 700 (i.e. in the testing environment), the MARK II 704 system is actively emulating the client spacecraft dynamics (via emulation controller 744). Hence, regardless of the scenario, whether it be the first scenario (passive capture) or second scenario (active capture), being tested, after capture the MARK I 702 and MARK II's 704 active control system will interact. If the respective arm control systems (arm controllers 722, 746) are not designed with this interaction in mind, the respective arm control systems 722, 746 may end up fighting each other, leading to significant degradation in the fidelity of the emulation in the best-case scenario, and to the introduction of control system instability in the worst case scenario. To maintain the fidelity of the task emulation, this behavior is obtained under the following constraints: (i) there is no communication/exchange of information between the two robotic systems 702, 704; and (ii) the MARK II 704 continues to accurately emulate the satellite behavior (via emulation controller 744) throughout the entire operation (unstable behavior would make the emulation diverge from the behavior of the actual system).

To successfully complete such a task, the overall system design ensures that the two systems interact passively, i.e., the interaction of the two systems 702, 704 does not inject energy into the system itself. This is a particularly challenging task to accomplish in that, after rigidization, there are several independent active control systems interacting with each other. Specifically, during a free flyer capture operation performed by system 700, the following control systems are often active at the same time:

On the MARK I 702:
  i) Arm Controller 722: provides arm and joint level commands based on inputs from external sensors, outputs from other controllers and automated commands:
    (a) Force Control: enabled to regulate the contact forces between the two robotic systems 702, 704;
    (b) Visual Servo Control: to maintain a certain stand off distance and match drift rate with the target satellite being emulated by the MARK II 704.
  ii) Emulation Controller 724: provides the option of matching the MARK I 702 tip dynamic response of the robotic manipulator 708 to that of a desired system.
  iii) Probe Controller 728: controls the probing mechanism (extend/retract) in coordination with the arm controller 722.
  iv) High-level automation/safety controller 730: provides system safety, and activates an appropriate control mechanism. This can include sensors that monitor behaviors such as manipulator 708 end-point force/moment sensor overloads, manipulator 708 end-point trajectory tracking, local manipulator 708 joint overloads, and collision monitoring of the manipulator 708 with itself or its environment. This monitoring is performed using both intrinsic and extrinsic sensing. Intrinsic Mark I 702 sensing may include joint position measurement, manipulator 708 joint current or torque sensing and relative position and orientation of other objects obtained from the vision system of the MARK I 702. Extrinsic sensing may include the use of optical tracking devices that track the position and orientation of points of resolution on the Mark I 702 and other points of resolution in the workspace.

On the MARK II 704:
  i) Arm Controller 742: provides arm and joint level commands based on inputs from external sensors, outputs from other controllers and automated commands;
  ii) Emulation Controller 744: emulates the dynamics of a floating passive spacecraft based on measured forces/moments # and configured body properties. The internal emulation package, executed by the emulation controller 744, can also simulate the action of an active attitude and/or orbital control system, such as attitude control system 746, adding a simulated control system to the list;
  iii) High-level automation/safety controller 748: provides system safety and activates appropriate control mechanisms. This safety checking may be achieved using methods and sensors like those used in the Mark I system 702 (such as described above).

All these control systems on the two robotic systems 702, 704 can interact with each other during contact between the Mark I and Mark II systems 702, 704, without direct knowledge of what the other robotic system is doing. In these circumstances, any sensor noise and time delay affecting the system could push the interaction towards instability. To ensure this does not happen, several steps may be taken, including: (a) careful tuning of the control systems involved to guarantee passive interaction (being too conservative, however, leads to significant performance degradation, both in the MARK I 702 performance and in the MARK II 704 emulation fidelity); (b) smoothing of the sensor data, to avoid instability issues induced by the two systems 702, 704 reacting to the sensor noise; (c) optimization of the computing and software running the two systems 702, 704 to minimize the time delays 762-774 (shown in FIG. 7) which will degrade the controller performance; and (d) adoption of emulation/control strategies naturally more robust to time delays (such as time delays 762-774 of FIG. 7).

FIG. 7 shows the system 700 and represents the interaction of various control systems on the two robotic systems 702, 704. It is important to note how the only connection between two MARK robots 702, 704 is coming from "visual tracking" 752 (referring to the ability of the MARK I 702 to receive and process relative pose information of the two systems 702, 704 from an independent vision system, emulating the presence of a machine vision algorithm processing camera views) and the "physical connection" 754 between the two systems 702, 704 (i.e. between probe 718 and target 740). The forces and moments 756, 758 (experienced by the MARK II 704 and MARK I 706, respectively) resultant from the physical contact between the robotic systems 702, 704 are at all times independently measured on the two robots 702, 704.

Details of a dynamic emulation layer of the system 700 will now be described with reference to FIG. 8.

Referring to FIG. 8, shown therein is a block diagram illustrating operation 900 of the emulation of the system 700, according to an embodiment.

Both the MARK I 702 and MARK II 704 are equipped with an internal emulation layer (dynamic emulation layer) 902a, 902b, referred to collectively as emulation layer 902 and generically as emulation layer 902. The emulation layer 902a, 902b may be the dynamic system emulator 114 of FIG. 1.

The internal emulation layer 902 is implemented by the emulation controller 724, 744 of the respective system 702, 704. The internal emulation layer 902 may include one or more software components executed by the respective emulation controller 724, 744. The internal emulation layer 902, 904 enables the tip (or some point of resolution near the free end) of the arm 708, 732 to replicate the behaviour of a desired dynamical system (e.g., a shorter/longer arm, or a lighter/heavier arm).

At its core, the emulation layer 902 is a multi-body dynamical system simulator running in the overall control system 710, 734 of each of the Mark I and Mark II systems 702, 704. This internal simulation 902 provides a reference trajectory for the arm 712, 736 to track based on three core elements: a dynamical system model, sensed forces and moments, and initial conditions.

The dynamical system model represents a mathematical model of the target behaviour of the tip of the arm 708, 732. The dynamical system model is implemented by the emulation layer 902 executed by the emulation controller 724, 744. Changing the dynamical system model being simulated allows for dramatically different motion behaviours to be emulated at the tip of the arm 708, 732. In an embodiment, the emulation software 902 allows an operator to build their own dynamical system model. This includes the rigid and flexible multi-body dynamics to simulate single bodies (spacecraft) or multiple body systems (multi-jointed robotic manipulators), electro-mechanical models emulating actively driven articulations (e.g., robot manipulator joints, attitude control devices such as reaction wheels or deployment actuators for satellite structures) and computing and software to represent the various control systems which control the dynamics of single or multiple bodies. The emulation package 902 may be configured to emulate a variety of system behaviours. System behaviours that may be emulated by the emulation layer 902 may include, for example, the dynamics of floating satellites or the tip dynamics of larger arms, allowing the MARK I 702 to accurately emulate the tip dynamics of systems that may not be capable of being physically tested in the lab.

The internal simulation 902 also provides a reference trajectory for the robotic arm to track based on sensed forces and moments. The internal simulation 902 is driven by the measured forces and moments 904a, 904b that the arm 708, 732 experiences during actual physical interaction in the testing environment (e.g., Mark I 702 arm 708 coming into contact with Mark II 704 arm 732 or Mark I 702 arm 708 contacting a static object). The contact forces and moments 904a, 904b are measured by the arm FMS (Force and Moment Sensor) 714, 738 in each of the Mark I and Mark II arms 708, 732 and fed to their respective dynamical system model simulations 902a, 902b as external disturbances. Based on the system mathematical model implemented by the emulation layer 902a, 902b, it is then possible to simulate the systems' 702, 704 responses to those forces and moments 904a, 904b and use the results to generate the reference trajectory for the arm 708, 732 to track.

The FMS measurements of the forces and moments 904a, 904b are outputted from the FMS 714, 738 to the emulation layer 902a, 902b with an associated time delay 914b, 914e.

The FMS measurements are received as input by the emulation layer 902a, 902b, which simulates the respective system's response to those forces and moment 904a, 904b. The emulator layer 902a, 902b generates a simulated response comprising a position and orientation tracking for the robotic system to track in order to emulate the dynamics of the emulated system. The simulated response output of the emulation layer 902a, 902b is outputted from the emulation layer 902a, 902b to an error determination unit 910a, 910b with an associated time delay 914c, 914f.

The MARK I hardware (HW) 708 and MARK II hardware (HW) 732 output measurements 906a, 906b. The measurements 906a, 906b may include joint and motor position/rate measurements used by the local arm and joint controllers. The measurements 906a, 906 may also include vision system estimation and/or force moment measurements. The measurements 906a, 906b, which include an associated time delay 914a, 914d, are provided as input to the error determination unit 910a, 910b.

Robotic manipulator control systems 710, 734 each include an error determination unit 910a, 910b. The error determination unit 910a, 910b receives inputs from the emulation layer 902a, 902b and the MARK I and MARK II HW 708, 732 and determines an error measurement 912a, 912b, which is provided to the arm and joint controllers 722, 742. The error measurement 912a, 912b is an error in the control system sense. The error measurement 912a, 912b is the difference between the desired value (as determined by the emulation) and the measured value of the joint position and/or velocity. The controllers 722, 742 generate command signals to send to the joints to correct the error between the measured joint position/velocity and the desired values (error measurement 912a, 912b).

The arm and joint controllers 722, 742 generate arm and joint commands 908a, 908b describing a reference trajectory for the arm mechanism of the MARK I and MARK II HW 708, 732 to track and provide the commands 908a, 908b to the MARK I and MARK II HW 708, 732.

The internal simulation 902 also generates and provides a reference trajectory for the robotic arm to track based on initial conditions. Initial conditions may be provided to the emulation package 902 to determine an initial state of the dynamical system being simulated. This enables, for example, assigning the arm 732 an initial desired drift rate when emulating the dynamics of the satellite.

In an embodiment, the reference trajectory may be based not only on the response to the disturbance but also a desired motion of the Mark I arm 708.

Based on the elements described above, the emulation package 902 produces the desired system response as a manipulator tip reference command 908a, 908b. The reference signal is then tracked via arm and joint control action.

The emulation package 902a, 902b has been implemented for both the MARK I and MARK II arm 708, 732. This means that both systems 702, 704 can enable their emulation features allowing operators to use the two arms 708, 732 to emulate the dynamics and interactions of completely different systems.

Referring again to FIGS. 6 and 7, the system 700 includes the mixed reality (MR) system 706 in communication with the MARK I 702 and MARK II 704 systems.

The use of MR by the MR system 706 allows a user to view the system state and telemetry for the system 700 in a single world view. Multiple robots or systems (e.g. system 702, 704) are displayed. The displayed systems may be scaled down or overlaid full scale on the system 702, 704 hardware. The MR system 706 can then be used to configure a virtual setup that is of interest to the user. This can be performed by both users in the lab or from a remote location. For example, the user can interact with the MR system 706 via a user interface and reconfigure the system 700 (and components thereof) through the user interface. Similarly, users can configure the physical elements of the MR world through user interface commands to the hardware or through actually moving the tips of the physical manipulators 708, 732 by hand enabled compliant control features in the respective Mark I and Mark II arm control systems 710, 734.

Various additional details and features of the system 700 described in FIGS. 7 to 9 will now be described.

The system 700 can act as a zero-gravity space robotics facility for design, development, and validation of robotics systems and mission operations that are to be used or performed in space. The system 700 may be for in-orbit robotics. Robotics has played a critical role in enabling human space exploration. Specifically, space manipulators have been critical to the success of Space Shuttle and International Space Station programs (e.g. Canadarm, Canadarm2, Dextre). Robotics will play an even more prominent role in upcoming space programs and missions (e.g. Canadarm3, satellite servicing). Space robots are expected to complete tasks of increasing complexity, with an always increasing level of autonomy.

The system 700 may be used to perform validation of guidance, navigation, and control (GNC) algorithms. The system 700 may validate and estimate the performance of GNC algorithms. Such validation and estimation can be used to meet increasing demands for performance of such algorithms.

A fundamental issue and problem addressed by the system 700 (and other systems described herein) is that the performance of a zero-gravity robotic system is wildly different from the performance of the same system on the ground. As a result, laboratory testing of the full robotic system is often impossible. GNC algorithm performance is often verified via a combination of high-fidelity simulations, ground testing: Single joint testbeds, Floating planar manipulators, one-gravity (1 G) arms.

The MARK I 702 may include a 6 degree-of-freedom manipulator 708 that is gravity-offloaded via a passive pulley-driven offloading system (including gantry offloader 720) at the manipulator 708 tip and counterbalance features in the manipulator 708 wrist and elbow. These features allow the MARK I 702 to emulate very closely the performance of a typical space manipulator in zero gravity.

The MARK I 702 may be a 6 degrees of freedom manipulator that is gravity-offloaded via a passive mechanism. This feature gives MARK I 702 the capability to reliably emulate the behavior of a space manipulator. Each joint of the arm mechanism 712 of the MARK I may be equipped with a set of LEDs (indicator lights) which color varies with the control mode the arm 708 is in. This feature may allow the robotic operators to always know the current state of the system from any position in the laboratory and to know whether it is safe to directly interact with the manipulator 708.

The system 700 may include arm control modes including safe, arm initialization, stand-by, passive limp, arm move, arm bored, with color indicators.

The system 700 may include swappable end-effectors. The end effector 714 of MARK I 702 may be swappable to allow for testing of a variety of different operations and arm mechanisms.

MARK I 702 can be controlled in a variety of ways. Control may include any one or more of hand controllers (with a computer user interface); a robotic operator; a pair, one for tip translation, one for rotation to emulate remote operations of the system.

Control may include a joystick that allows operators to control the arm 708 while standing in its proximity to inspect the system during its operation.

The system 700 may include a computer user interface for allowing an engineer/user to script a complex series of commands that the arm 708 can execute (using arm controller 722).

MARK II 704 includes a 7 degree of freedom one-gravity (1G) arm 732 generally used for dynamic system emulation and to perform cooperative tasks with the MARK I 702.

The 7 degree of freedom manipulator 732 may be used for dynamic system manipulation and to test collaborative tasks that require the MARK I 702 to interact with another active system (e.g. emulation of braked canadarm2). This facilitates the ability to test performance and/or interaction with large dynamic systems such as the 17-meter long Canadarm2 that would otherwise not be possible in a laboratory setting.

The system 700 may be equipped with internal module which allows use of the manipulator tip to emulate a variety of dynamical system responses (e.g. emulating behavior of a typical mass spring damper system). Leveraging this feature provides the user with the unique capability to both actively emulate a variety of worksite behaviors while also providing the flexibility to change their mechanical properties on the fly.

The system 700 includes an internal emulation package 902 that can be configured to emulate the behavior of free floating satellites of various inertias. The emulated satellite can also activate its own emulated attitude control system 746 to recover the original attitude after an external perturbation is introduced. The system's attitude remains unchanged even after operator perturbs the system.

In an embodiment, the MR system 706 uses Microsoft Hololens 2 technology (or similar technology) to provide the operator a highly immersive mixed reality environment for training and collaborative design.

The Hololens 2 technology may provide an enhanced understanding of the test being executed by the robotics system 700. The MR system 706 may be configured to overlay graphic satellite models on the MARK II 704 such that the observer sees the motion of the satellite driven by the MARK II's manipulator 732 tip motion, rather just than seeing the manipulator's 732 tip emulating that motion. This may also include internal views of operations such as dynamic part mating where the internal contact of capture probe 718 in the liquid apogee nozzles (target 740) of a client spacecraft or other "peg-in-hole" type mating operations; perspectives which may only be enabled by introduction of mixed reality.

Applications (tests and operations performed) of the system 700 include mission planning, robotic interface testing, and free-flyer capture operations.

Mission planning includes lab support operations in the design of complex operations involving robotic systems. An operator may use the MR system 706 to directly control and reposition the MARK II 704 and MARK I 702 to support the design of a free flyer capture operation. The operator can modify the arm configuration virtually and have the robotic system 702, 704 execute the desired maneuvers.

The system 700 may enable testing of robotic interfaces such as by having the MARK I 702 being operative to try to install a mock-up of a robotic interface where the other half of interface being held by the MARK II during the entire operation. This setup allows testing of robotic compatibility of a given interface, as well as estimating the expected loads experienced by the arm 708 and the other side of the interface (on manipulator 732 of MARK II 704) during the entire operation.

Free flyer capture operations include capability to test free flyer capture as well as operation requiring cooperation between multiple robotic systems 702, 704 and MARK I 702 attempting to capture a target floating satellite whose behavior is being emulated by the MARK II 704. After capture is complete, the two systems 702, 704 will drift together and the captured satellite (emulated by the MARK II 704) initiates an attitude correction maneuver, and the MARK II 704 will be able to comply to the attitude correction maneuver. The two systems 702, 704 interact with each other in a stable way even after the system is perturbed by the operator.

While the above description provides examples of one or more apparatus, methods, or systems, it will be appreciated that other apparatus, methods, or systems may be within the scope of the claims as interpreted by one of skill in the art.

The invention claimed is:

1. A system for ground testing robotic systems for space, the system comprising:
　a first robotic testing system comprising:
　　a first robotic manipulator;
　　a first dynamic system emulator configured to simulate a motion behaviour response of a zero-gravity (0G) servicer robotic arm based on forces and moments measured by the first robotic manipulator during physical interaction of the first robotic manipulator with a second robotic manipulator emulating motion behaviour of a client space robotic system;
　　a first arm controller configured to generate a first manipulator tip reference trajectory command based on the motion behaviour response simulated by the first dynamic system emulator and provide the first manipulator tip reference trajectory command to the first robotic manipulator; and
　　a first arm mechanism in the first robotic manipulator configured to track a first trajectory based on the first manipulator tip reference trajectory command, such that the first robotic manipulator emulates motion behaviour of the 0G servicer robotic arm; and a second robotic testing system comprising:
　　the second robotic manipulator;
　　a second dynamic system emulator configured to simulate a motion behaviour response of the client space robotic system based on forces and moments measured by the second robotic manipulator during physical interaction of the second robotic manipulator with the first robotic manipulator emulating motion behaviour of the 0G servicer robotic arm;
　　a second arm controller configured to generate a second manipulator tip reference trajectory command based on the motion behaviour response simulated by the second dynamic system emulator and provide the second manipulator tip reference trajectory command to the second robotic manipulator; and
　　a second arm mechanism in the second robotic manipulator configured to track a second trajectory based on the second manipulator tip reference trajectory command, such that the second robotic manipulator emulates motion behaviour of the client space robotic system.

2. The system of claim 1, further comprising a mixed reality system communicatively connected to the first and second robotic testing systems and configured to overlay a first virtual model of the 0G servicer robotic arm onto the first robotic manipulator and a second virtual model of the client space robotic system onto the second robotic manipulator.

3. The system of claim 1, wherein the client space robotic system being emulated by the second robotic testing system is a free floating spacecraft.

4. A robotic testing system for ground testing performance of a space robotic system, the robotic testing system comprising:
　a first robotic manipulator;
　a dynamic system emulator configured to simulate a motion behaviour response of a first space robotic system based on forces and moments measured by the first robotic manipulator during physical interaction of the first robotic manipulator with a second robotic manipulator emulating motion behaviour of a second space robotic system;
　an arm controller configured to generate a manipulator tip reference trajectory command based on the motion behaviour response simulated by the dynamic system emulator and provide the manipulator tip reference trajectory command to the robotic manipulator; and
　an arm mechanism in the first robotic manipulator configured to track a trajectory based on the manipulator tip reference trajectory command, such that the first robotic manipulator emulates motion behaviour of the first space robotic system.

5. The system of claim 4, wherein the first space robotic system is a 0G servicer robotic arm.

6. The system of claim 4, wherein the first space robotic system is a client space robotic system to be serviced by a servicer robotic arm.

7. The system of claim 6, wherein the client space robotic system is a free floating satellite.

8. The system of claim 7, further comprising a user interface for receiving an initial condition assigning an initial desired drift rate to the second robotic manipulator emulating the free floating satellite.

9. A method of ground testing and validating robotic interaction between two independent space robotic systems, the method comprising:

emulating motion behaviour of a zero-gravity (0G) servicer robotic arm with a first robotic arm using a first dynamic system emulator in the first robotic arm configured to capture manipulator tip dynamics of the 0G servicer robotic arm;

emulating motion behaviour of a free floating satellite with a second robotic arm using a second dynamic system emulator in the second robotic arm configured to capture dynamics of the free floating satellite;

physically interacting the first robotic arm with the second robotic arm while emulating the motion behaviours;

measuring forces and moments experienced by the first robotic arm based on the physical interaction via a force moment sensor (FMS) in the first robotic arm;

measuring forces and moments experienced by the second robotic arm based on the physical interaction via an FMS in the second robotic arm;

simulating a response to the measured forces and moments by the first robotic arm using the first dynamic system emulator;

simulating a response to the measured forces and moments by the second robotic arm using the second dynamic system emulator;

tracking a trajectory with the first robotic arm based on the simulated response outputted by the first dynamic system emulator; and tracking a trajectory with the second robotic arm based on the simulated response outputted by the second dynamic system emulator.

10. The method of claim 9, further comprising providing initial conditions to each of the first and second dynamic system emulators to determine initial states for the 0G servicer robotic arm and free floating satellite being emulated.

11. The method of claim 10, wherein the initial conditions provided to the second dynamic system emulator include an initial drift of the emulated free floating satellite.

12. The method of claim 9, further comprising overlaying a virtual model of the 0G servicer robotic arm being emulated onto the first robotic arm and overlaying a virtual model of the free floating satellite being emulated onto the second robotic arm.

13. The method of claim 9, further comprising gravity offloading the first robotic arm to 0G via a passive offloading mechanism.

14. The method of claim 9, further comprising gravity offloading the first robotic arm to 0G via an active offloading mechanism comprising a third robotic manipulator.

15. The method of claim 9, further comprising adjusting a mass, inertia, stiffness, or damping property of the emulated free floating satellite by the dynamic system emulator to emulate a mass or inertia changing event on the emulated spacecraft.

* * * * *